United States Patent [19]

Snow, Jr. et al.

[11] 3,882,065
[45] May 6, 1975

[54] HOT MELT ADHESIVES OF IMPROVED MELT VISCOSITY STABILITY

[75] Inventors: Austin Matthew Snow, Jr., Wilmington, Del.; Ronald Earl Uschold, Beaumont, Tex.

[73] Assignee: E. I. du Pont de Nemours & Company, Wilmington, Del.

[22] Filed: June 27, 1973

[21] Appl. No.: 373,914

Related U.S. Application Data

[63] Continuation-in-part of Ser. No. 346,832, April 2, 1973, abandoned.

[52] U.S. Cl. ...... 260/28.5 B; 260/27 R; 260/27 BB; 260/28.5 A
[51] Int. Cl. ............................................. C08f 45/52
[58] Field of Search ........ 260/28.5 A, 28.5 B, 27 R, 260/27 BB, 45.7 R

[56] References Cited
UNITED STATES PATENTS

| 3,220,966 | 11/1965 | Flanagan | 260/28.5 A |
| 3,235,532 | 2/1966 | Hopper | 260/45.7 R |
| 3,321,428 | 5/1967 | Tordella | 260/28.5 A |
| 3,382,208 | 5/1968 | Cyba | 260/45.7 R |
| 3,646,101 | 2/1972 | Cyba | 260/45.7 R |
| 3,669,926 | 6/1972 | Cyba | 260/45.7 R |

*Primary Examiner*—Joseph L. Schofer
*Assistant Examiner*—Paul R. Michl

[57] ABSTRACT

The viscosity stability of hot melt adhesives containing an elastomeric linear EPDM, branched ethylene/propylene copolymer, or propylene/hexene-1 dipolymer is markedly improved by inclusion in the adhesive composition of boric acid, boric anhydride, or a boric acid ester, in combination with a phenolic antioxidant.

17 Claims, No Drawings

HOT MELT ADHESIVES OF IMPROVED MELT VISCOSITY STABILITY

This application is a continuation-in-part of our copending application Ser. No. 346,832, filed Apr. 2, 1973 now abandoned.

BACKGROUND OF THE INVENTION

This invention relates to hot melt adhesive compositions containing certain elastomeric copolymers; and more particularly relates to those hot melt adhesives having improved viscosity in the molten state.

Hot melt adhesives, commonly referred to as hot melts, have found wide industrial acceptance for use in laminating various substrates such as paper, cardboard, and metal foil. Hot melts are generally mixtures of wax, tackifying ingredients, polymeric materials, and optionally other ingredients such as antioxidants. The hot melts are solid at room temperatures and bonding is accomplished by heating the adhesive composition to form a flowable tacky melt, applying the melt to a substrate to form a coating thereon, placing a second substrate on the hot melt coating, and cooling the resulting laminate to a temperature below the melt temperature of the adhesive composition to form an adhesive bond between the substrates.

Commercial apparatus for applying hot melts generally has a melting zone, a reservoir for storing molten adhesive, and an adhesive applicator. The reservoir is usually designed to hold sufficient adhesive to meet application requirements for several hours. Thus, the reservoir may hold 50 pounds of adhesive. Residence time in the reservoir will vary from sample to sample.

It is often important that adhesive fed from the reservoir to the applicator have uniform viscosity. In the sealing of cardboard cartons (case sealing), for instance, the hot melt is usually fed from the reservoir to an applicator nozzle. Significant viscosity increases during the course of a production run may lead to plugging of the nozzle. Significant viscosity decrease will cause over-application of adhesive and may lead to an unacceptable decrease in adhesive strength.

The industry will typically prefer the adhesive composition to have a viscosity change less than 20%, and preferably less than 5%, after 96 hour exposure to application temperatures, generally about 177° to 190° C.

The art has often suggested inclusion of an elastomeric polymer in hot melt adhesive compositions. Elastomeric ethylene/propylene copolymers having side-chain unsaturation have been proposed, for instance, because of their excellent modulus and tensile properties and compatibility with other ingredients in the hot melt composition. It has been found, however, that hot melts containing these copolymers are susceptible to viscosity changes when held in the molten state for protracted periods of time. This viscosity instability has restricted their use in viscosity sensitive processes, such as case sealing.

SUMMARY OF THE INVENTION

According to this invention, there are now provided hot melt adhesive compositions having improved viscosity stability and comprising, in parts by weight,
1. 100 parts petroleum wax;
2. 40 to 200 parts tackifying resin;
3. 15 to 100 parts of at least one of
   a. an elastomeric linear EPDM copolymer, or
   b. an elastomeric branched copolymer of ethylene, at least one $C_3$ to $C_{18}$ alpha-olefin, at least one direactive nonconjugated diene, and optionally at least one monoreactive nonconjugated diene, said copolymer having a Mooney viscosity of about 10 to 70;
4. at least 2.2 parts of a boric additive per 100 parts of elastomeric copolymer, and
5. at least 2.2 parts of a phenolic antioxidant per 100 parts of elastomeric copolymer.

For the purpose of the present invention, the term "boric additive" means boric acid, boric anhydride, a boric ester, or a mixture of two or more such compounds.

This invention also provides hot melt adhesive compositions containing propylene/hexene-1 dipolymer as the elastomeric component. In this case, the quantities of tackifying resin, elastomeric polymer, boric additive and phenolic antioxidant are as given above, but the quantity of wax can vary from 0 to about 50 parts per 100 parts of elastomer.

DETAILED DESCRIPTION OF THE INVENTION

As used herein, the term "petroleum wax" refers to both paraffin wax and microcrystalline wax as well as equivalent synthetic waxes.

Paraffin wax is a mixture of solid hydrocarbons derived from the overhead wax distillate fraction obtained from the fractional distillation of petroleum. After purification, the paraffin wax contains hydrocarbons that generally fall within the formula $C_{23}H_{48}$ — $C_{35}H_{72}$. Paraffin wax is a substantially colorless, hard, translucent material usually having a melting point of about 52° to 85° C. Microcrystalline wax is obtained from the nondistillable still residues from the fractional distillation of petroleum. It differs from paraffin wax in having branched hydrocarbons of higher molecular weights. It is considerably more plastic than paraffin wax and usually has a melting point of about 66° to 93° C. Also useful are synthetic waxes such as Fischer-Tropsch wax.

Use of tackifying resins in hot melt adhesives is well known in the art, and conventional resins compatible with both the selected wax and elastomeric polymer can be used to advantage. By "compatible" is meant that the resin should not part to form a separate phase when the composition is heated to form a melt. When the elastomeric polymer is a linear EPDM or branched copolymer, as hereinafter described, the tackifying resin should be present in the amount of about 40 to 200 parts, and preferably 100 to 150 parts, per 100 parts of wax. When the elastomeric polymer is a propylene/hexene-1 dipolymer, the tackifying resin should be present in the amount of about 40 to 1400 parts, and preferably 100 to 1000 parts, per 100 parts of dipolymer.

Representative tackifying resins which can be used with advantage include natural rosins such as gum rosin, wood rosin, and tall wood rosin; hydrogenated wood rosin; esters of natural rosins such as methyl and glyceryl esters of wood rosins; and methylated paraffinic chain hydrocarbon resins. Particularly useful are the aliphatic petroleum hydrocarbon resins prepared by polymerizing olefins and diolefins. These hydrocarbon resins generally have a Ring and Ball softening point of from 10° to 135° C. Commercially available resins of this type include synthetic polyterpene resins, such as "Wing-Tack" 95 sold by Goodyear Chemicals. Other commercially available resins are "Betaprene" H resins sold by Reichold Chemical Corporation.

Additional useful tackifying resins include hydrocarbon resins prepared by polymerizing fractions of crude oil, such as "PICCOTAC" resins sold by Pennsylvania Industrial Chemical Corporation; and terpene polymers having a ball and ring softening point of about 10° to 135° C. Other tackifying resins will be known to those skilled in the art.

The hot melt adhesive composition contains at least about 15 parts of an elastomeric linear EPDM copolymer or branched ethylene/alpha-olefin copolymer per 100 parts of wax to achieve flexible bonding. As the proportion of copolymer increases, melt viscosity of the hot melt composition also increases. Generally, there is no need to exceed about 100 parts copolymer per 100 parts wax. Useful copolymers generally have a Mooney viscosity ML-1 + 4/121°C. of about 10 to 70.

Linear EPDM copolymers which can be selected are well known in the art. These copolymers are usually prepared by copolymerizing ethylene, propylene, and a nonconjugated diene in the presence of a coordination catalyst. The nonconjugated diene can be either linear or cyclic. Representative linear dienes include 1,4-hexadiene; 1,6-octadiene; and 1,8-decadiene. Representative cyclic dienes include 5-ethylidene-2-norbornene, 5-methylene-2-norbornene, dicyclopentadiene, and the like. Other useful dienes and their resulting EPDM copolymers are well known to the art skilled.

Branched copolymers which can be selected are copolymers of ethylene, a $C_3$ to $C_{18}$ alpha-olefin, and at least one direactive nonconjugated diene. By "direactive" is meant that the diene will copolymerize with other monomers present during polymerization through both of its double bonds. Optionally, a monoreactive diene can be present during polymerization. By "monoreactive" is meant that only one of the diene double bonds will enter the polymerization reaction. These branched copolymers can be prepared by polymerizing the monomers in an inert solvent in the presence of a coordination catalyst, as disclosed in Canadian Pat. No. 855,774 to Campbell and Thurn.

Propylene is the preferred alpha-olefin, although other alpha-olefins, such as 1-hexene, 1-butene, 1-decene, and 1-dodecene can be selected with advantage. Representative direactive dienes copolymerized to introduce branching include monomers having two terminal double bonds, such as 1,4-pentadiene; 1,5-hexadiene; and 1,7-octadiene. The direactive diene can also be a strained-ring diolefin, such as the reaction product of norbornadiene-2,5 and cyclopentadiene, or preferably 2,5-norbornadiene. Representative monoreactive dienes which may optionally be copolymerized include cycloaliphatic compounds such as 5-ethylidene-2-norbornene, 5-methylene-2-norbornene, and 5-propenyl-2-norbornene; and nonconjugated aliphatic diolefins such as 1,4-hexadiene, 1,5-octadiene, and the like.

The propylene/hexene-1 copolymers contain about 10 to 50 weight percent hexene-1 and are prepared by copolymerizing propylene and hexene-1 in the presence of a solid titanium trichloride catalyst in the form of $\gamma$-$TiCl_3$ and an organoaluminum co-catalyst at 0° to 100° C. and at elevated pressures.

The boric additive should be present in an amount of at least about 2.2 parts per 100 parts of polymer.

The boric additive is dispersed in the hot melt composition and the upper concentration limit is the quantity which can be successfully compounded with the other hot melt ingredients. Usually, however, no advantage is obtained by adding more than about 15 parts per 100 parts of polymer. Preferably, the boric additive is present in about 5 to 10 parts per 100 parts polymer.

A boric acid ester can be boric additive, within the scope of this invention. Esters which can be selected are compounds known in the art and include alkyl, cycloalkyl, and aryl esters. Representative are tributyl, tricyclohexyl, tri-isoamyl, and triphenyl borates.

Boric anhydride is also known as boron trioxide, fused boric acid, or anhydrous boric acid.

It is essential that a phenolic antioxidant be present in at least about 2.2 parts per 100 parts of elastomeric copolymer. Especially favorable results are obtained when the phenolic antioxidant is present in quantities approximately equal to those of the boric additive. Useful phenolic antioxidants are known to those skilled in the art. Preferred are hydroquinone and hindered phenolic antioxidants, such as octadecyl 3-(3', 5'-di-t-butyl-4'-hydroxyphenyl) propionate; tetrakis[methylene-3-(3', 5'-di-t-butyl-4'-hydroxyphenyl)propionate]methane; 1,3,5-trimethyl-2,4,6-tris(3', 5'-di-t-butyl-4'-hydroxybenzyl)benzene; 2,6-di-t-butyl-4-methyl phenol; 4,4'-thiobis(6-t-butyl-m-cresol); 2,2'-methylene-bis(4-methyl-6-t-butyl-phenol); and 2,6-di-t-butyl-$\alpha$-dimethylamino-p-cresol. By "hindered phenolic antioxidant" is meant a phenolic antioxidant having alkyl group(s) in the ortho position relative to the hydroxy group on the ring. Of the hindered phenolic antioxidants, 2,6-di-t-butyl-4-methyl phenol is preferred.

Minor amounts of conventional adhesion promoters, such as maleic anhydride grafted polyethylene, can be included in the adhesive composition to enhance performance of the composition. Polypropylene plasticizer can be used in place of part of the elastomeric copolymer without undue loss of physical properties. Extender oils, such as a paraffinic petroleum oil, can be used to like advantage, if desired.

In a preferred embodiment, the hot melt adhesive is used in a low viscosity application, such as case sealing, and has a viscosity in the order of 100 to 10,000 centipoise as measured at 190° C. with an RTV Brookfield Thermosel viscometer using a No. 21 spindle at 20 rpm. Branched copolymers of the type hereinbefore described have proven especially useful in formulating low viscosity adhesive compositions. Melt viscosity is adjusted by varying the ratio of wax and tackifying resin to branched polymer within the prescribed ranges hereinbefore established. Preferably, the hot melt composition contains, based on 100 parts wax, about 100 to 150 parts tackifying resin, and about 20 to 50 parts branched copolymer.

When propylene is selected as the alpha-olefin, as in the preferred case, the branched copolymer generally contains about 40 to 80% by weight ethylene, about 0.01 to 0.5 mole direactive diene per kilogram of copolymer, and optionally about 0 to 2 moles monoreactive diene per kilogram of copolymer. The balance is propylene. Preferred branched copolymers contain about 70 to 74% by weight ethylene and about 0.1 to 0.3 mole direactive diene per kilogram of copolymer, the preferred direactive diene being 2,5-norbornadiene. Preferably, as in the case of 1,4-hexadiene, the monoreactive diene is present in about 0 to 6% by weight. The balance is propylene.

These branched copolymers especially adapted for low viscosity application will preferably have a Mooney viscosity ML-1 +4/121°C. of about 18 to 30 and, when used in a nozzle applicator, will not contain gel particles large enough to plug the nozzle orifice. Gel content and gel particle size is conveniently reduced by decreasing the quantity of direactive diene in the polymer if unacceptable gel is present.

The low viscosity hot melt composition preferably contains an effective amount of boric additive and phenolic antioxidant to stabilize the composition against viscosity changes in the molten state greater than 20%, preferably 5%, after 96 hour exposure to application temperatures which are usually about 177° to 190° C. Necessary quantities of boric additive and phenolic antioxidant to achieve the desired degree of stabilization are readily determined by varying the proportions present in the hot melt composition, holding the compositions at the elevated application temperature for 96 hours, and determining the viscosity changes experienced by the various compositions. The effective amount will vary with the particular branched polymer, wax, and tackifying resin selected for use as well as the temperature and time of testing. In general, however, the quantities of boric additive and phenolic antioxidant required will be at least about 2.2 parts per 100 parts of branched polymer.

Hot melt adhesive compositions of this invention are conveniently prepared in an agitated, oil-jacketed kettle heated at about 163° to 191° C. First the wax and resin are introduced and allowed to melt. Then the elastomeric copolymer is added and mixing is continued until it dissolves. Finally, the boric additive, phenolic antioxidant, and optional adhesion promoters are added. When the resulting stirred mixture is homogeneous, it is poured and allowed to cool.

Alternatively an internal mixer, such as one having a sigma blade, can be employed. In this case, the polymer is added before the wax. The optional adhesion promoters and antioxidants are then introduced. At least 30 minutes of mixing is generally required to ensure a homogeneous melt.

Hot melt adhesive compositions of this invention having a melt viscosity of about 100 to 10,000 cps have utility in low viscosity applications, such as case sealing. Compositions having higher viscosities can be used in other adhesive applications, such as those employing a gear or wheel applicator. To increase melt viscosity, the quantity of elastomeric copolymer relative to wax and tackifying resin is increased.

In the examples that follow, all parts and percentages are by weight unless otherwise indicated. Viscosity measurements are as taken with an RVT Brookfield Thermosel viscometer using a No. 21 spindle at 20 rpm unless otherwise indicated. Ring and Ball softening points are determined following the procedures of ASTM E-28-58T.

EXAMPLE 1

A. Formulation of Hot Melt Compositions

The synthetic resin used is a synthetic polyterpene resin having a Ring and Ball softening point of 100° ± 5° C., sold as "Wing-Tack" 95 by Goodyear Chemicals. The petroleum wax used is a fully refined paraffinic wax having a melt point of 61° C. (ASTM Test Method D-87). The branched elastomeric tetrapolymer used has the following monomer unit composition: ethylene, 72.75%; propylene, 23%; 2,5-norbornadiene, 0.15%; and 1,4-hexadiene, 4.1%. This tetrapolymer has an inherent viscosity of 1.25 at 30° C. (measured on a solution of 0.1 gram of tetrapolymer in 100 ml of tetrachloroethylene), and a Mooney viscosity (ML-1 + 4/121° C.) of 19.

A 2-gallon agitated, oil-jacketed mixing kettle is heated to about 177° C. and charged with 100 parts of Wing-Tack 95 and 100 parts of refined paraffinic wax. When these components have melted, 40 parts of tetrapolymer are slowly added. Sequentially, 2 parts of maleic anhydride grafted polyethylene, 2.4 parts of 2,6-di-t-butyl-4-methyl phenol, and 2.4 parts of boric acid powder are added. When the resulting stirred mixture has become homogeneous, it is poured into a container and allowed to cool. For test purposes, a portion of the mixture is collected on a stainless steel tray, cooled, and cut into 1-inch squares when solid. Typical results of viscosity measurements are recorded in Table 1.

TABLE 1

| COMPOSITION | | PROPERTIES | | |
|---|---|---|---|---|
| Ingredient | Parts | Hours at 190° C. | Visc (cps) | % Change |
| Branched Tetrapolymer | 40.0 | 0 | 1545 | — |
| Polyterpene Resin | 100.0 | 24 | 1512 | −2.1 |
| Wax | 100.0 | 48 | 1480 | −4.2 |
| Maleic Anhydride Grafted Polyethylene | 2.0 | 72 | 1482 | −4.1 |
| 2,6-di-t-butyl-4-methyl phenol | 2.4 | 96 | 1492 | −3.4 |
| Boric Acid Powder | 2.4 | | | |
| | 246.8 | | | |

B. Comparative Example

For comparison, a hot melt adhesive composition is prepared using the ingredients and following the procedures of Part (A) except that boric acid and the hindered phenol are not added to the adhesive composition. Results are shown in Table 2.

TABLE 2

| Ingredient | COMPOSITION Parts | PROPERTIES Hours at 190° C. | Visc. (cps) | % Change |
|---|---|---|---|---|
| Branched Tetrapolymer | 40.0 | 0 | 1285 | 0 |
| Polyterpene Resin | 100.0 | 0.75 | 1207 | −6.1 |
| Wax | 100.0 | 1.5 | 1175 | −8.6 |
| | 240.0 | 4.75 | 1095 | −15 |
| | | 6.75 | 925 | −28 |
| | | 24 | 512 | −60 |

This example shows melt instability when boric acid and a hindered phenolic antioxidant are not included in the hot melt composition.

C. Comparative Example

For comparison, compositions are prepared using the branched tetrapolymer, polyterpene resin, and wax of Part (A). One composition contains only boric acid, and the second composition contains only the hindered phenolic antioxidant. Results are shown in Table 3.

TABLE 3

| Ingredient | Parts | Ingredient | Parts |
|---|---|---|---|
| Branched Tetrapolymer | 40 | Branched Tetrapolymer | 40 |
| Polyterpene Resin | 100 | Polyterpene Resin | 100 |
| Wax | 100 | Wax | 100 |
| 2,6-di-t-butyl-4-methyl phenol | 3 | Boric Acid Powder | 2.4 |
| | 243 | | 242.4 |

| Hours at 190° C. | Visc. (cps) | % Change | Hours at 190° C. | Visc. (cps) | % Change |
|---|---|---|---|---|---|
| 18 | 1095 | — | 0 | 1345 | — |
| 44 | 953 | −13 | 24 | 957 | −29 |
| 68 | 758 | −31 | 48 | 685 | −49 |
| 92 | 545 | −50 | | | |

This example shows that boric acid or hindered phenolic antioxidant, by itself, somewhat improved viscosity stability of the hot melt but not to the degree obtained when both were present as in Part (A).

EXAMPLE 2

To demonstrate selection of other α-olefin copolymers, tackifying resins, boric acid esters, and hindered phenols, compositions were prepared following the procedures of Example (1A). Resulting hot melt compositions are given in Table 4. These compositions were tested for viscosity stability as described in Example (1A) with the results recorded in Table 5.

The tables show that in the presence of tributyl borate or boric acid, together with a hindered phenolic antioxidant, the melt viscosities of hot melts containing propylene/1-hexene copolymer and ethylene/propylene/1,4-hexadiene copolymer as well as hot melts containing the branched tetrapolymer are improved. Compositions 2, 4 and 13 are particularly suited for use in case sealing due to their high degree of viscosity stability.

TABLE 4

| Composition | 1 | 2 | 3 | 4 | 5 | 6 | 7 | 8 | 9 | 10 | 11 | 12 | 13 |
|---|---|---|---|---|---|---|---|---|---|---|---|---|---|
| Branched Tetrapolymer[1] | 40 | 40 | 40 | 40 | 40 | 40 | 40 | 40 | — | — | — | — | 40 |
| Propylene/1-Hexene Copolymer[2] | — | — | — | — | — | — | — | — | 40 | 40 | — | — | — |
| Ethylene/Propylene Terpolymer[3] | — | — | — | — | — | — | — | — | — | — | 40 | 40 | — |
| Polyterpene Resin[1] | 100 | 100 | — | 100 | 100 | 100 | 100 | 100 | 100 | 100 | 100 | 100 | — |
| Petroleum hydrocarbon resin[4] | — | — | 100 | — | — | — | — | — | — | — | — | — | 100 |
| Wax | 100 | 100 | 100 | 100 | 100 | 100 | 100 | 100 | 100 | 100 | 100 | 100 | 100 |
| Boric Acid Powder | — | 2.4 | 2.4 | 2.4 | 1.2 | 0.6 | 2.4 | 0.6 | 2.4 | — | 2.4 | — | 2.4 |
| Tributyl Borate | 2.4 | — | — | — | — | — | — | — | — | — | — | — | — |
| 2,6-di-t-butyl-4-methyl phenol | 2.4 | — | 2.4 | 2.4 | 1.2 | 0.6 | 0.6 | 2.4 | 2.4 | — | 2.4 | — | 2.4 |

TABLE 4 — Continued

| Composition | 1 | 2 | 3 | 4 | 5 | 6 | 7 | 8 | 9 | 10 | 11 | 12 | 13 |
|---|---|---|---|---|---|---|---|---|---|---|---|---|---|
| Hydroquinone | — | 2.4 | — | — | — | — | — | — | — | — | — | — | — |
| Maleic anhydride grafted polyethylene | — | 2.0 | 2.0 | 2.0 | 2.0 | 2.0 | 2.0 | 2.0 | — | — | 2.0 | — | 2.0 |

(1)As identified in Example 1.
(2)Block copolymer prepared by slurry polymerization of propylene and 1-hexene in presence of γ-TiCl₃ and an organoaluminum compound; 27% 1-hexene, 73% propylene; M.I. = 70 (ASTM-D-1238)
(3)72% ethylene, 25.2% propylene, 2.8% 1,4-hexadiene; ML-4 of 60 at 250° F.
(4)Comp. 3: Ring and Ball Softening Point 119° C.; "PICCOTAC" A by Pennsylvania Industrial Chemical Corp.
Comp.13: Ring and Ball Softening Point 97° C.; "PICCOTAC" B by Pennsylvania Industrial Chemical Corp.

TABLE 5

| Composition | Hours at 190°C. | | | | | Total Change(1) |
|---|---|---|---|---|---|---|
| | 0 | 24 | 48 | 72 | 96 | (%) in 96 hrs. |
| 1 | 1227 | 1215 | 1232 | 1202 | 1142 | −7 |
| 2 | 1510 | 1505 | 1507 | 1525 | 1450 | −4 |
| 3 | 1945 | 1970 | 1962 | 2088 | 2192 | +12.7 |
| 4 | 1545 | 1512 | 1480 | 1482 | 1482 | −3.4 |
| 5 | 1480 | 1397 | 1360 | 1320 | 1262 | −14.7 |
| 6 | 1477 | 1342 | 1230 | 1120 | 847 | −42.6 |
| 7 | 1350 | 1268 | 1260 | 1230 | 1140 | −15.6 |
| 8 | 1355 | 1262 | 1168 | 1030 | 707 | −47.8 |
| 9 | 101 | 96.5 | 92.0 | 86.0 | — | −15.0(2) |
| 10 | 93.5 | 41.0 | 26.0 | 20.0 | — | −78.6(2) |
| 11 | 38400 | 36350 | 32200 | 30750 | 30000 | −21.9 |
| 12 | 39800 | — | — | — | — | −89(3) |
| 13 | 1760 | 1722 | 1730 | 1762 | 1792 | +1.8 |

(1) Sample 11 at 1 rpm; Sample 12, No. 27 Spindle at 5 rpm
(2) Total Change (%) in 72 hours
(3) After 44 hours read 4,350; run discontinued

EXAMPLE 3

The following materials were mixed together for two minutes in an internal mixer. Polymer charge drop temperature was 215° F.

| Ingredients | Parts |
|---|---|
| Boric Anhydride | 10 |
| 2,6-di-t-butyl-4-methylphenol | 9 |
| Branched elastomeric tetrapolymer of Example 1A | 132 |

A hot-melt adhesive was prepared using the above mixture. A two-liter flask was heated to 177° C. and charged with 100 parts of Wingtack-95 and 100 parts of refined paraffinic wax having a melting point of 71° C. (ASTM Test Method D-87). When these components melted, 44.8 parts of the above mixture was slowly added. Finally, two parts of maleic anhydride-grafted polyethylene were added. When the resulting stirred mixture was homogeneous, it was poured into a container and allowed to cool. Typical results of viscosity measurements are:

| Hours at 190°C. | Viscosity (cps) | % Change |
|---|---|---|
| 0 | 1210 | — |
| 24 | 1218 | +0.7 |
| 48 | 1215 | +0.4 |
| 72 | 1218 | +0.7 |
| 96 | 1235 | +2.1 |

This example illustrates that boric anhydride in combination with a phenol antioxidant is an efficient stabilizer for hot melt adhesives.

What is claimed is:

1. A hot melt adhesive composition comprising, in parts by weight, about:
   1. 100 parts of petroleum wax;
   2. 40 to 200 parts of a tackifying resin;
   3. 15 to 100 parts of at least one of
      a. an elastomeric linear EPDM copolymer,
      b. an elastomeric branched copolymer of ethylene, at least one $C_3$ to $C_{18}$ alpha-olefin, and at least one direactive nonconjugated diene, and
      c. an elastomeric branched copolymer of ethylene, at least one $C_3$ to $C_{18}$ alpha-olefin, at least one direactive nonconjugated diene, and at least one monoreactive nonconjugated diene, said copolymer having a Mooney viscosity of about 10 to 70;
   4. at least 2.2 parts of a boric additive per 100 parts of elastomeric copolymer; and
   5. at least 2.2 parts of phenolic antioxidant per 100 parts of elastomeric copolymer;
   said boric additive being at least one of boric acid, and boric anhydride.

2. The composition of claim 1 containing an effective amount of boric additive and phenolic antioxidant to stabilize the composition against viscosity changes, after 96 hours in the molten state, in excess of about 20%.

3. The composition of claim 2 wherein the branched copolymer contains about 40 to 80% by weight ethylene, about 0.01 to 0.5 mole direactive diene per kilogram of copolymer, and about 0 to 2 moles monoreactive diene per kilogram of copolymer, the balance being propylene.

4. The composition of claim 3 wherein the direactive diene is 2,5-norbornadiene.

5. The composition of claim 3 wherein the direactive diene is 1,7-octadiene.

6. The composition of claim 2 wherein the EPDM copolymer is a copolymer of ethylene, propylene, and 1,4-hexadiene.

7. The composition of claim 1 having a viscosity of about 100 to 10,000 centipoises wherein the elastomeric component is a branched copolymer containing 40 to 80% by weight ethylene, about 0.1 to 0.5 mole direactive diene per kilogram of copolymer, and about 0 to 2 moles monoreactive diene per kilogram of copolymer, the balance being propylene.

8. The composition of claim 7 containing an effective amount of boric additive and phenolic antioxidant to stabilize the composition against viscosity changes, after 96 hours in the molten state, in excess of about 20%.

9. The composition of claim 7 wherein the phenolic antioxidant is a hindered phenolic antioxidant or hydroquinone.

10. The composition of claim 9 wherein the direactive diene is 2,5-norbornadiene.

11. The composition of claim 9 wherein the direactive diene is 1,7-octadiene.

12. The composition of claim 1 wherein the elastomeric component is a branched copolymer containing 40 to 80% by weight ethylene, about 0.1 to 0.3 mole direactive diene per kilogram of copolymer, and about 0 to 2 moles monoreactive diene per kilogram of copolymer, the balance being propylene; said copolymer having a Mooney viscosity of about 18 to 30; and the amount of boric additive and phenolic antioxidant being effective to stabilize the composition against viscosity changes, after 96 hours in the molten state, in excess of about 20%.

13. The composition of claim 12 wherein the phenolic antioxidant is at least one of hydroquinone and a hindered phenolic antioxidant.

14. The composition of claim 13 wherein the direactive diene is 2,5-norbornadiene.

15. The composition of claim 13 wherein the direactive diene is 1,7-octadiene.

16. The composition of claim 13 wherein the amount of boric additive is effective to stabilize the composition against viscosity changes, after 96 hours in the molten state, in excess of about 5%.

17. The composition of claim 16 wherein the elastomeric branched copolymer contains about 70 to 74% by weight ethylene, about 0.1 to 0.3 mole 2,5-norbornadiene per kilogram of copolymer, up to 6% by weight 1,4-hexadiene, the balance being propylene.

* * * * *